INVENTORS
RAY JOHN GATZ
WARREN E. BEUTLER
BY Williams, David,
Hoffmann & Yunt.
ATTORNEYS

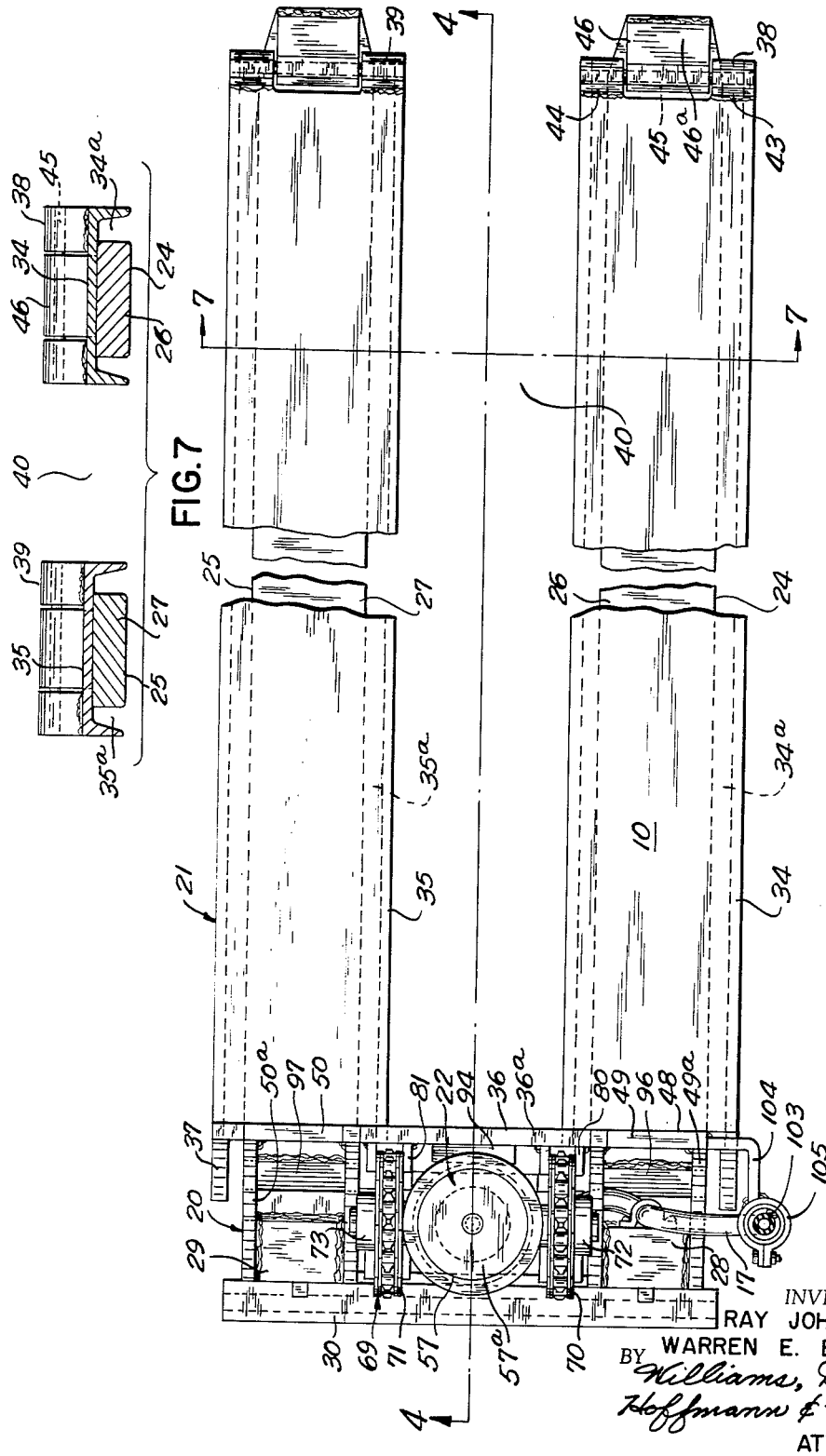

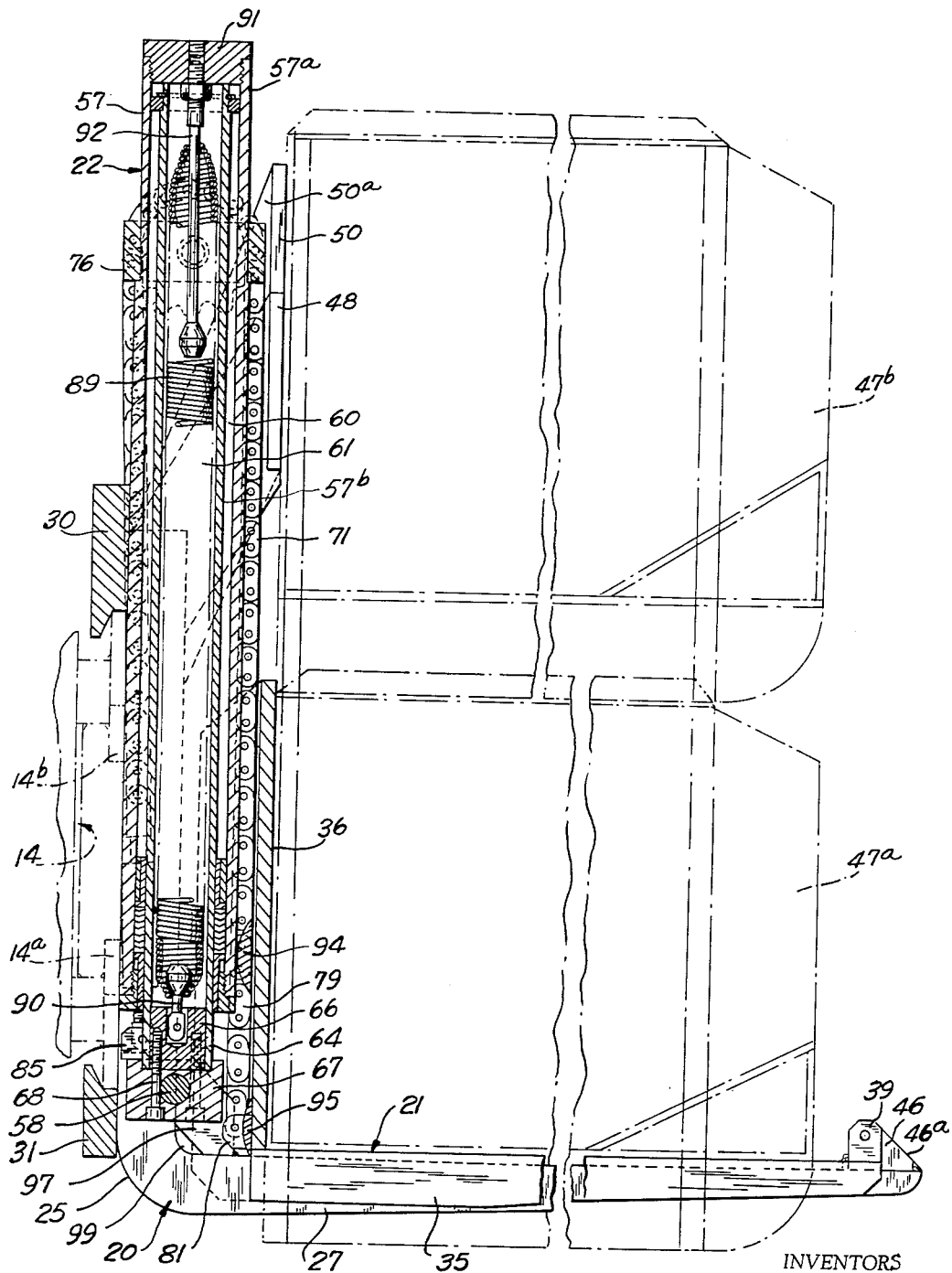

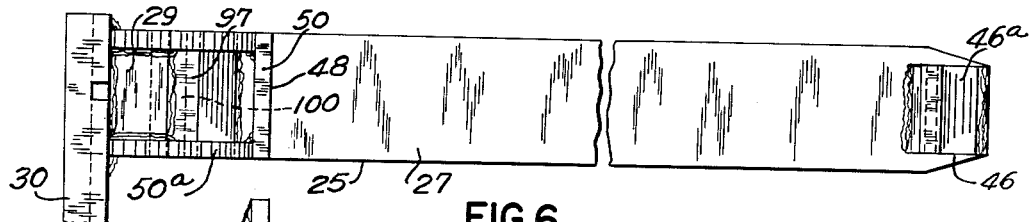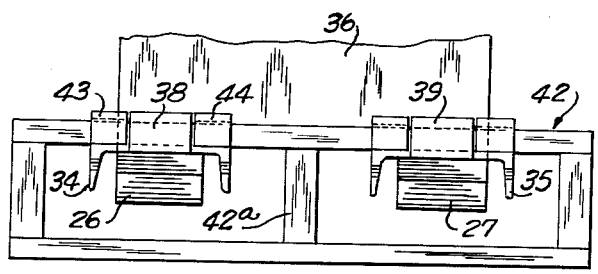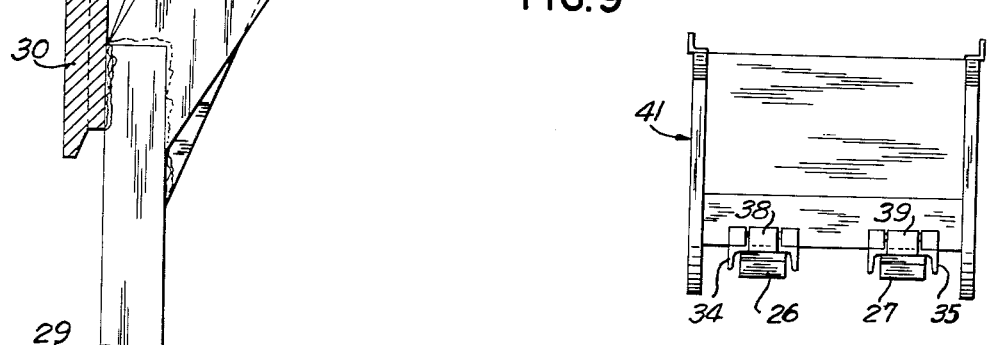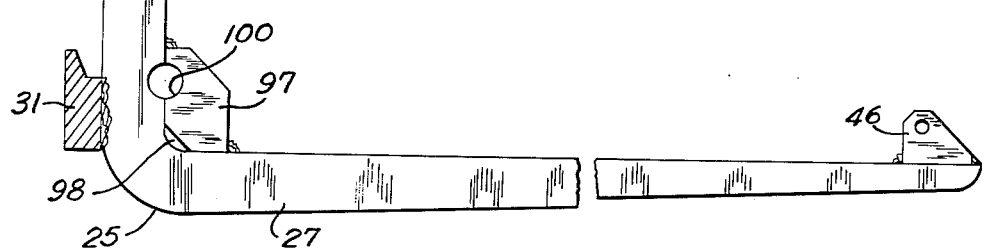

3,199,697
LIFTING AND DUMPING APPARATUS
Ray John Gatz, Lakewood, and Warren E. Beutler, Willoughby, Ohio, assignors to The Lamson & Sessions Company, Cleveland, Ohio, a corporation of Ohio
Filed Sept. 6, 1962, Ser. No. 221,769
10 Claims. (Cl. 214—620)

This invention relates to lifting and dumping apparatus for handling and emptying containers and for other purposes and, as one of its objects, aims to provide novel apparatus of this kind which will operate rapidly and safely and which will handle various different load items, including stack bins and pallets, with equal facility and regardless of whether they have a single recess or a plurality of recesses on the underside thereof.

Another object is to provide novel lifting and dumping apparatus for handling containers or other load items and which includes load engageable means enabling the apparatus to safely handle a plurality of such load items in a stacked relation.

Still another object is to provide novel lifting and dumping apparatus comprising a base having a pair of forwardly extending and laterally spaced fork arms and a carrier vertically swingable relative to the base for moving a container or the like to a dumping position, the carrier also having a pair of forwardly extending laterally spaced fork arms in superposed relation to the fork arms of the base, and hinge means pivotally connecting the forward ends of the two pairs of fork arms and projecting thereabove to form a stop for the container carried by the carrier when the latter is swung to a dumping position.

A further object is to provide novel lifting and dumping apparatus for use on a wheeled vehicle having a power source thereon, such as a lift truck, and which apparatus includes power operated elevator means for moving a carrier means to a container dumping position and flexible power medium conducting means connecting the elevator means with the power source in a manner to permit the operation of the apparatus without hindrance by such conducting means and without fouling or kinking of the latter.

Additionally, this invention provides novel lifting and dumping apparatus having a base and a mast means extensible and swingable relative to the base for moving a carrier to a dumping position, and wherein anchor blocks mounted in certain corner recesses of the base provide a strong and simplified pivot mounting for the mast means.

Other objects, novel characteristics and advantages of this invention will be apparent in the following detailed description and in the accompanying drawings forming a part of this specification and in which, FIG. 1 is a side elevation of lifting and dumping apparatus embodying this invention and showing the apparatus in combination with a lift truck;

FIG. 3 is mainly a top plan view of the apparatus when viewed as indicated by the line 3—3 of FIGS. 1 and 2;

FIG. 4 is a section taken through the apparatus on the vertical mid-plane thereof as indicated by section line 4—4 of FIGS. 2 and 3;

FIG. 5 is a vertical section taken through the apparatus on section line 5—5 of FIG. 2 but with the swingable carrier omitted;

FIG. 6 is a top plan view of the portion of the apparatus shown in FIG. 5;

FIG. 7 is a vertical section taken through the fork arms transversely thereof as indicated by section line 7—7 of FIG. 1;

FIG. 8 is an end elevation on a smaller scale and showing the fork arms in lifting engagement with a stack bin as a load item; and FIG. 9 is an end elevation showing the fork arms in lifting engagement with a pallet as a load item.

Figure 1:
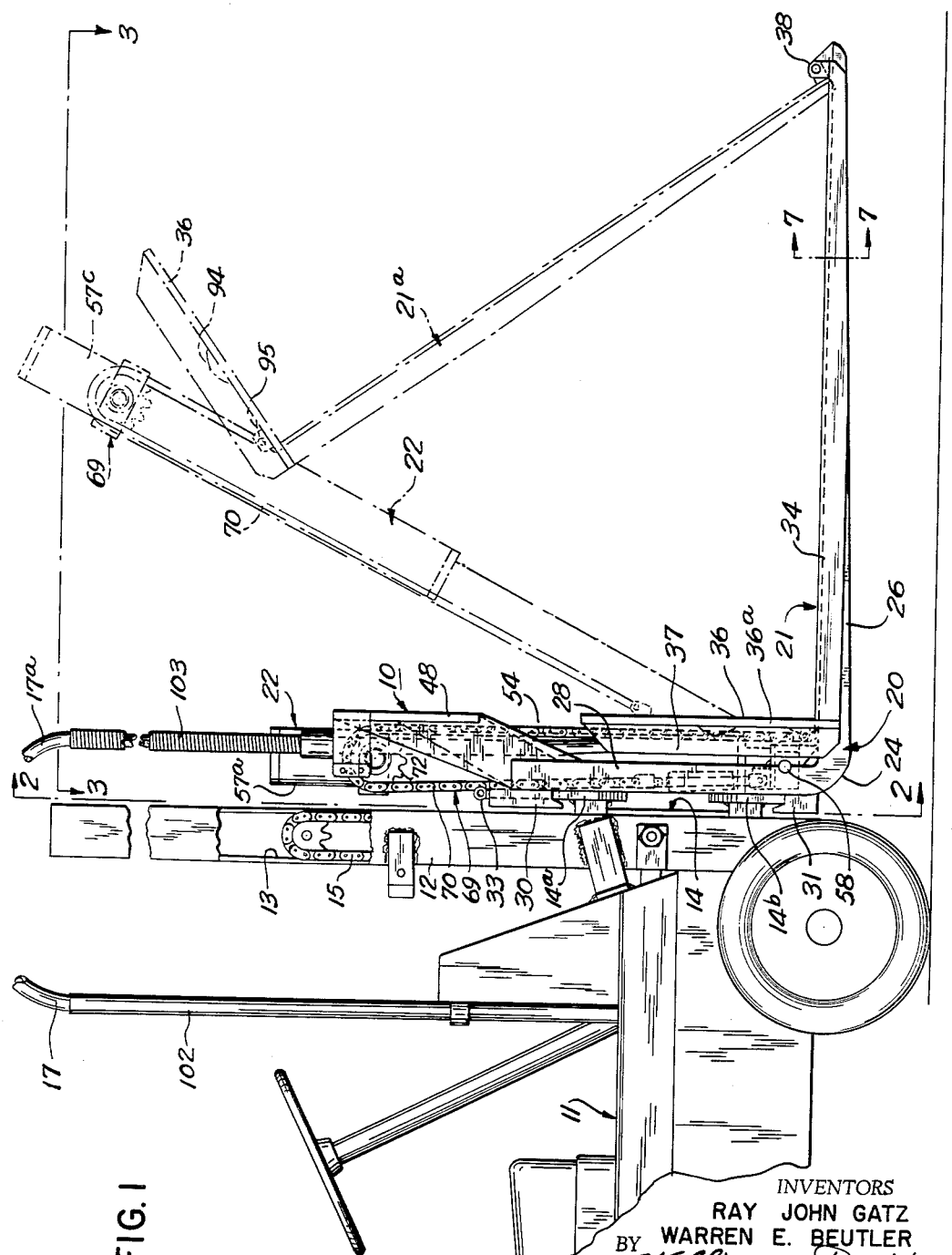

In the accompanying drawings the novel lifting and dumping apparatus 10 is shown in combination with, and mounted on, a wheeled vehicle 11 of the lift truck type. The truck 11 is of a conventional form having upright post means 12 at the front end thereof providing a vertical guideway 13 in which a first elevator means 14 is movable by power means 15 located on the truck. The power equipment of the truck 11 includes fluid pressure generating means which is here represented merely by flexible conduit means 17 extending from the truck for supplying pressure fluid, preferably hydraulic pressure fluid, to the lifting and dumping apparatus 10. The first elevator means 14 includes a pair of vertically spaced upper and lower bracket members 14$^a$ and 14$^b$ to which the lifting and dumping apparatus 10 is attached in a manner to be explained hereinafter.

The lifting and dumping apparatus 10 comprises, in general, a base 20, a carrier 21 for receiving the load item or items thereon and swingable relative to the base, and a second elevator means 22 operable to swing the carrier 20 to an elevated and inclined dumping position 21$^a$ shown in phantom lines in FIG. 1. The first elevator means 14 operates to lift or lower the apparatus 10 as a unit, and the second elevator means 22 causes swinging of the carrier 21 to and from its inclined dumping position 21$^a$.

The base 20 comprises a pair of laterally spaced fork members 24 and 25 providing a pair of substantially parallel lower fork arms 26 and 27 extending forwardly from the truck 11 in a substantially horizontal plane. The fork members 24 and 25 also provide a pair of laterally spaced upright bracket arms 28 and 29 which, in this case, are formed by upwardly bent rear end portions of the fork members. The fork members 24 and 25 are connected and rigidly held in their laterally spaced relation by a pair of vertically spaced and laterally extending upper and lower hanger plates 30 and 31 which are connected, as by welding, to the upright bracket arms 28 and 29.

The vertical spacing of the hanger plates 30 and 31 and the cross-sectional shape of these plates along the adjacent edges thereof are such as to adapt the hanger plates for connecting engagement with the bracket members 14$^a$ and 14$^b$ of the first elevator means 14 for mounting the lifting and dumping apparatus 10 on the truck 11. One or more retractible locking pins 33 are provided in the upper hanger plate 30 for releasable locking co-operation with the upper bracket member 14$^a$. Mounting and dismounting of the apparatus 10 relative to the truck 11 can be accomplished by sliding the hanger plates 30 and 31 along the upper and lower edges of the bracket members 14$^a$ and 14$^b$ (see FIG. 1).

The carrier 21 comprises a pair of laterally spaced upper fork arms 34 and 35 and a vertical end wall means 36 extending transversely of such upper fork arms and connecting the same at the rear ends thereof. The end wall means 36 maintains the upper fork arms 34 and 35 in a rigidly connected and substantially parallel relation so that these arms project forwardly from the truck 11 in a substantially horizontal plane and in a superposed relation to the lower fork arms 26 and 27 when the carrier 21 is in its lowered position adjacent the base 20. The end wall means 36 is here shown as comprising a single vertically-edgewise disposed plate member 36$^a$ which is braced along opposite vertical edges thereof by bracing plates 37 attached thereto. When the carrier 21 is in its lowered position the plate member 36ᵃ occupies a position just in front of the second elevator means 22.

The fork members 24 and 25 of the base 20 are preferably, though not necessarily, made in the form of solid metal bars (see FIG. 7) for maximum strength and rigidity thereof but the upper fork arms 34 and 35 of the carrier 21 have longitudinal recesses 35ᵃ and 34ᵃ in the underside thereof for receiving the lower fork arms 26 and 27 when the carrier is lowered to its full-line position shown in FIG. 1. The recesses 35ᵃ and 34ᵃ are conveniently obtainable by using channel-shaped metal members for the upper fork arms 34 and 35. To provide for the vertical swinging movement of the carrier 21 relative to the base 20, the upper fork arms 34 and 35 are connected at their forward ends with the forward ends of the lower fork arms 26 and 27 by a pair of laterally spaced hinges 38 and 39.

By having the lower and upper pairs of fork arms 26, 27 and 34, 35 in the laterally spaced and superposed relation just described above, it will be seen that these pairs of superposed arms extend forwardly from the truck 11 with an intervening clear space or slot 40 therebetween as shown in FIG. 3. This spaced relation readily permits the fork arms of the lifting and dumping apparatus 10 to be moved to a load-engaging position beneath the load which is to be lifted and permits this to be accomplished regardless of whether the load includes a container such as the stack bin 41 shown in FIG. 8 or the conventional pallet 42 shown in FIG. 9. When the load includes a pallet, the intervening space 40 between the pairs of superposed fork arms will accommodate the center member 42ᵃ usually present on the underside of such pallets. The pairs of superposed fork arms 26, 27 and 34, 35 of the lifting and dumping apparatus 10 will therefore be readily movable into engagement with the underside of the load regardless of whether the load has a single recess or a pair of recesses on the underside thereof.

For minimum interference of the lifting and dumping apparatus 10 with the load during movement of the superposed fork arms 26, 27 and 34, 35 beneath the same, the hinges 38 and 39 are of a construction so as to have only a small vertical height. The hinges 38 and 39 serve a second purpose, however, namely that of retaining the load on the carrier 21 when the latter is swung to its tilted dumping position 21ᵃ, and therefore, portions of these hinges should still be of a sufficient vertical height for such retaining co-operation with the load.

The hinges 38 and 39 are of identical construction and only one of them, namely the hinge 38, will be described in detail. The hinge 38 comprises a pair of laterally spaced hinge lugs 43 and 44 secured as by welding in a rigid relation on the forward end of the upper fork arm 34 and a hinge pin 45 mounted in such hinge lugs. The hinge 38 also comprises a hinge bracket 46 rigidly secured as by welding on the forward end of the lower fork arm 26. The intermediate portion of the hinge pin 45 extends through and is pivoted in the hinge bracket 46 for the above-mentioned vertical swinging of the carrier 21 relative to the base 20. The hinge bracket 46 is of a generally triangular shape and is disposed in a position so that the front side thereof provides an upwardly and rearwardly inclined bevel 46ᵃ for facilitating entry of the fork arms into the recesses on the underside of the load to be lifted.

To adapt the lifting and dumping apparatus 10 for the handling of a load comprising a plurality of vertically-stacked load items, such as the two stack bins 47ᵃ and 47ᵇ shown in phantom lines in FIG. 4, a second end wall means 48 is provided in a vertically spaced relation above the rear end wall means 36 of the carrier 21. This second or upper end wall means 48 is stationary in the sense that it is connected with the base 20. The second end wall means 48 is here shown as comprising a pair of vertically extending laterally spaced plate members 49 and 50 located on laterally opposite sides of the second elevator means 22 and pairs of bracket plates 49ᵃ and 50ᵃ connecting such plate members with the upper ends of the bracket arms 28 and 29.

When the load to be lifted consists of the two bins 47ᵃ and 47ᵇ in a stacked relation as shown in FIG. 4, the rear end of the lower bin 47ᵃ will be engageable with the end wall means 36 of the carrier 21 and rear end of the upper bin 47ᵇ will be engageable with the second end wall means 48. The second end wall means 48 thus provides an additional upper abutment means on the apparatus 10 for retaining the upper load item in proper position on the apparatus during travel of the truck 11. Since the second end wall means 48 is spaced in a vertical relation above the first or lower end wall means 36, the intervening space 54 provides clearance to accommodate the upward swinging of the carrier 21 to its inclined dumping position 21ᵃ without interference of the lower end wall means 36 with the stationary upper end wall means 48.

The second elevator means 22 is here shown as comprising an extensible mast 57 rising above the rear end portion of the base 20 and having its lower end swingably connected with the base by a horizontal pivot pin 58. The mast 57 is formed by a pair of telescoping upper and lower mast members 57ᵃ and 57ᵇ of which the upper member 57ᵃ is a cylinder member and the lower member 57ᵇ is a hollow piston member. The space between the walls of the cylinder and piston members 57ᵃ and 57ᵇ provides a cylinder chamber 60 to which the hydraulic pressure fluid is supplied for causing vertical extension of the mast 57. The flow of pressure fluid into and out of the cylinder chamber 60 takes place through the passage 61 of the hollow piston member 57ᵇ. The lower end portion 64 of the piston member 57ᵇ projects from the cylinder member 57ᵃ and has the delivery end of the flexible conduit 17 connected therewith so as to communicate with the piston passage 61 through a suitable coupling 65.

The projecting lower end portion 64 of the hollow piston member 57ᵇ is provided with a closure plug 66 and is connected with a pivot block 67 by suitable connecting screws 68 extending through such pivot block into the closure plug. The pivot block 67 is journalled on the pivot pin 58 for the above-mentioned swingable connection of the mast 57 with the base 20.

The cylinder member 57ᵃ of the mast 57 forms the vertically movable member of the elevator means 22 and is connected with the carrier 21 by motion amplifying means 69 comprising a pair of laterally spaced chains 70 and 71 located on laterally opposite sides of the mast. The chains 70 and 71 extend over a pair of sheave wheels which are here shown as sprockets 72 and 73 and which are rotatably mounted on shaft extensions 74 and 75 of a clamping collar 76 secured on the cylindrical member 57ᵃ. The portions of the chains 70 and 71 which extend over the sprockets 72 and 73 are intermediate bight portions of these chains.

Figure 2:
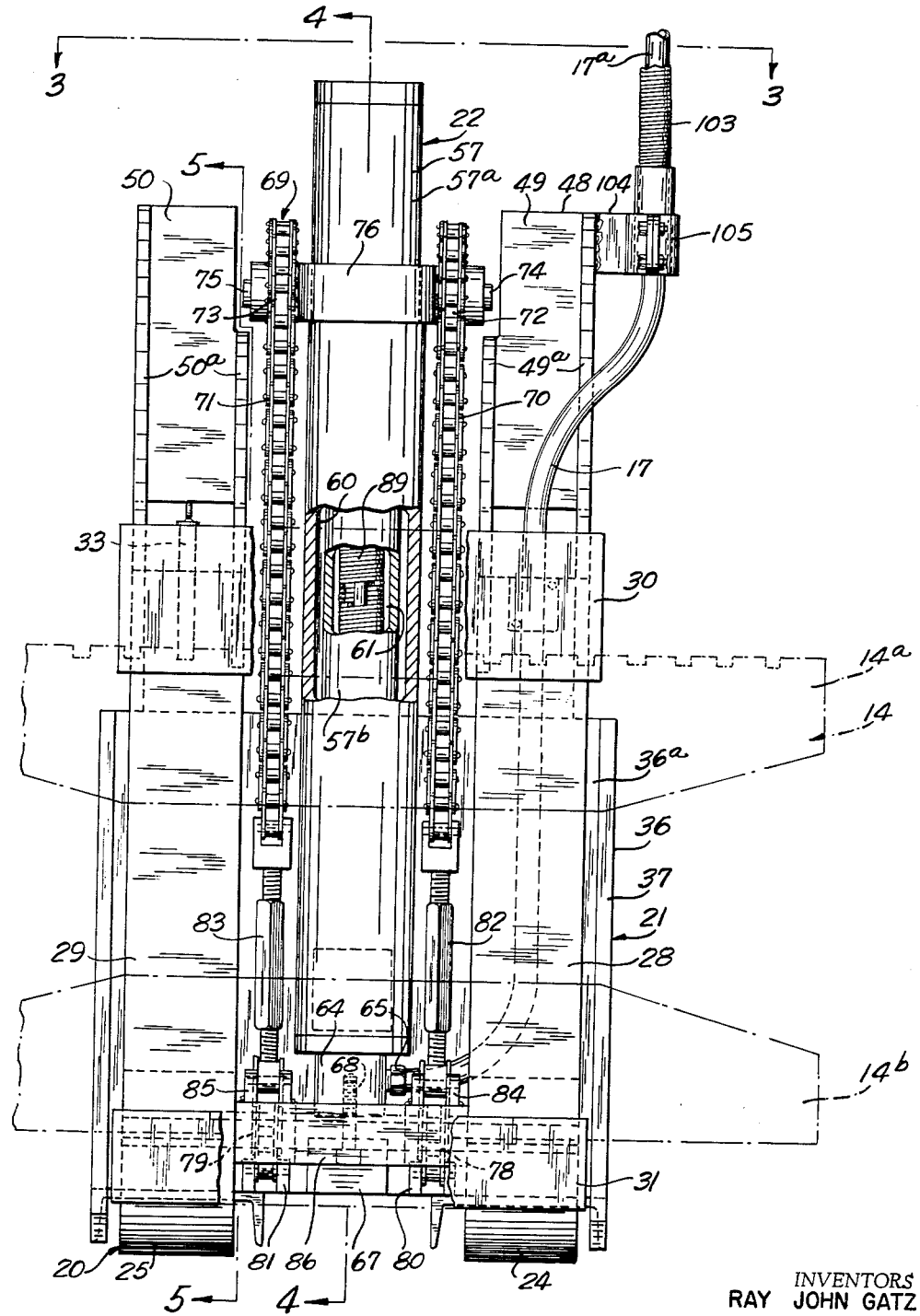
FIG. 2 is a rear elevation of the apparatus when viewed as indicated by the line 2—2 of FIG. 1 and showing the apparatus with portions thereof broken away.

The chains 70 and 71 have lower end portions 78 and 79 at one end thereof which are connected with brackets 80 and 81 provided on the carrier 21 at laterally spaced points thereof as shown in FIGS. 2 and 3. At the other end thereof, the chains 70 and 71 are provided with length-adjusting devices such as the turnbuckles 82 and 83 by which such other ends are connected with the base 20. The turnbuckles 82 and 83 are connected with the base 20 as by means of a pair of laterally spaced anchorage brackets 84 and 85 (see FIG. 2). The anchorage brackets 84 and 85 are mounted on an intermediate bar 86 of the base 20 which extends between, and is secured to, the upright bracket arms 28 and 29 as shown in FIG. 2.

From the construction described above for the second elevator means 22 and the connection thereof with the carrier 21 by the motion amplifying means 69 which includes the chains 70 and 71 it will be seen that, when the cylinder member 57ᵃ of the mast 57 is in its lowermost position, the mast will be in a collapsed or retracted condition and the carrier will then be in its lowered position adjacent the base 20 which is the normal load-receiving position for the carrier. When pressure fluid supplied from the truck 11 through the flexible conduit 17 is delivered into the cylinder chamber 60 through the hollow piston member 57ᵇ, the mast 57 will be extended by upward movement of the cylinder member 57ᵃ. This upward movement of the cylinder member 57ᵃ will cause the chains 70 and 71 to produce an accelerated upward swinging movement of the carrier 21 on the hinges 38 and 39 during which the mast 57 will also swing on the pivot pin 58 to the forwardly inclined phantom-line position 57ᶜ shown in FIG. 1.

The accelerated lifting movement imparted to the carrier 21 rapidly swings the same to its inclined dumping position 21ᵃ for discharging the load items from the carrier or for dumping articles out of a container or the like located on the carrier. When the discharging of the load is by dumping a container, the container is retained on the carrier by the pairs of hinge lugs 43, 44 of the hinges 38 and 39. When the pressure fluid previously supplied to the cylinder chamber 60 is released therefrom, the mast 57 returns to its collapsed or retracted position and the carrier 21 is thereupon lowered with an accelerated motion to its normal load-receiving full-line position of FIG. 1.

To facilitate the movement of the mast 57 to its retracted condition a tension spring 89 is provided in the mast and is connected between the cylinder and piston members 57ᵃ and 57ᵇ thereof. As shown in FIG. 4, the spring 89 is located in the passage 61 of the piston member 57ᵇ and has its lower end connected with the closure plug 66 by a headed connecting link 90. The upper end of the spring 89 is connected with a closure plug 91 provided in the upper end of the cylinder member 57ᵃ as by means of a longer link 92. The link 92 is shown as having a headed stem slidable in the upper end of the spring 89 and which stem is of a length to permit a predetermined extent of free movement of the cylinder member 57ᵃ relative to the piston member 57ᵇ before the spring is subjected to tension. This free movement is desirable to facilitate assembly of the components of the mast 57.

During the movement of the carrier 21 to and from its inclined dumping position 21ᵃ, the end wall means 36 of the carrier has a combined rocking and sliding movement relative to the cylinder member 57ᵃ of the mast 57. To facilitate this combined rocking and sliding movement without interference and without gouging of the cylinder member by the carrier 21, guide means is provided therebetween which is here shown as comprising a pair of vertically spaced convex guide members 94, 95 mounted on the end wall means 36. During the lifting and lowering of the carrier 21, one or both of the convex guide elements 94, 95 will co-operate smoothly with the wall of the cylinder member 57ᵃ by a combined sliding and rocking engagement therewith.

The mounting of the pivot pin 58 of the mast 57 on the base 20 is facilitated by providing the base with a pair of bearing blocks 96 and 97 which are in a laterally spaced relation and are located in the angle recesses 98 of the fork members 24 and 25 as shown in FIGS. 3, 4 and 5. The bearing blocks 96 and 97 are secured in the corner recesses 98 by being welded to the fork members 24 and 25, and adjacent co-operating portions of the fork members and the bearing blocks have openings 100 drilled or otherwise formed therein for receiving the ends of the pivot pin 58. The pivot pin 58 can be retained in assembled position in the openings 100 as by means of set screws (not shown) provided in the bearing blocks 96 and 97.

For rapid and safe use of the lifting and dumping apparatus 10 by the first elevator means 14, it is desirable to prevent fouling or kinking of the flexible conduit 17 as well as to prevent the conduit from hampering the movements of the driver of the truck 11. This is accomplished by providing guide means on the truck 11 and on the apparatus 10 for confining portions of the flexible conduit 17 while still permitting limited movement of such conduit. The guide means provided on the truck 11 comprises a rigid vertical hollow standard 102 suitably attached to the truck and rising to an appropriate height and through which one portion of the flexible conduit 17 extends. The guide means on the apparatus 10 comprises a flexible hollow standard 103 in the nature of a spring formed of helically coiled wire and through which another portion of the flexible conduit 17 extends in passing downward to the point of connection with the projecting piston portion 64 of the mast 57. The guide members 102 and 103 extend upwardly in a substantially parallel relation so that the portion of the flexible conduit extending therebetween is in the form of an upwardly arched bight portion 17ᵃ.

The flexible character of the guide member 103 permits shifting and flexing of the conduit 14 in a manner to prevent fouling or kinking thereof while the apparatus 10 is being lifted or lowered by the first elevator means 14. The flexible guide member 103 has the lower end thereof mounted on the apparatus 10, in this case, on the upper end wall means 48 of the base 20. The guide member 103 is attached to the end wall means 48 as by means of a mounting bracket 104 having a clamping portion 105 in which the lower end of this guide member is received and held.

From the accompanying drawings and the foregoing detailed description it will now be readily understood that this invention provides novel lifting and dumping apparatus which, in combination with a vehicle of the lift-truck type, is usable in a highly practical and efficient manner for transporting, lifting and dumping various load items. It will now also be readily understood that the novel lifting and dumping apparatus 10 can be provided on a lift truck during the initial construction thereof or can be provided as an attachment for use on a previously constructed lift truck. It will likewise be seen that the novel lifting and dumping apparatus of this invention is usable with various different loads since the laterally spaced pairs of superposed fork arms are movable into either single or plural recesses existing in the underside of the load to be lifted. Additionally, it will be understood that the construction of the lifting and dumping apparatus 10 is such as to safely accommodate load items in a stacked relation, and to prevent fouling or kinking of flexible power medium conducting means extending from the truck to the lifting apparatus.

Although the lifting and dumping apparatus of this invention has been illustrated and described herein to a somewhat detailed extent it will be understood, of course, that the invention is not to be regarded as being limited correspondingly in scope but includes all changes and modifications coming within the terms of the claims hereof.

Having described our invention, we claim:

1. In lifting and dumping apparatus; a base having a first upright rear wall means and a first forwardly extending portion projecting therefrom; a carrier adapted to receive a load thereon comprising containers in a stacked relation; said carrier comprising a second upright rear wall means and a second forwardly extending portion connected therewith; hinge means connecting said first and second forwardly extending portions adjacent the front ends thereof and providing for upward swinging of said carrier to an inclined dumping position; mast means connected with said base and extending thereabove; elevator means movable along said mast means and connected with said carrier for causing the swinging movement of the latter; said second forwardly extending portion being engageable with said load on the underside thereof and said second upright rear wall means being engageable with the rear portion of a lower one of said containers; and load engageable means on said first upright rear wall means and projecting forwardly and upwardly therefrom so as to occupy a position substantially in vertical alignment with and spaced above said second upright rear wall means, when said carrier is in its lowered position, for engagement with the rear portion of an upper one of said containers, said mast means being pivotally connected with said base for swinging relative thereto; said rear wall means comprising wall portions spaced apart laterally for movement of said mast means therebetween.

2. Lifting and dumping apparatus according to claim 1 wherein said mast means is pivotally connected with said base for swinging relative thereto; said elevator means comprising cylinder means located in said mast means; flexible conduit means connected with said cylinder means for supplying pressure fluid thereto; and an upright laterally flexible hollow standard mounted on said first rear wall means and providing a guide passage through which a portion of said conduit means extends.

3. Lifting and dumping apparatus according to claim 2 wherein said hollow standard is flexible and comprises helical spring means.

4. A lifting and dumping apparatus of the fork-lift type, a framework comprising a base, a carrier upwardly swingable relative to said base to an inclined dumping position, mast means connected with said base and extending thereabove and including elevator means connected with said carrier for imparting the upward swinging movement thereto, said base comprising a pair of forwardly projecting laterally spaced lower fork arms each terminating in a forward end and adapted to be received in separate recesses under a pallet, said carrier comprising a pair of forwardly extending laterally spaced upper arms in superposed relation to said lower arms whereby said arms may be received with said fork members in separate recesses under a pallet, a pair of hinges pivotally connecting the forward ends of said upper arms with the forward ends of the subjacent lower arms for the upward swinging movement of said carrier about the pivotal connection, said upper arms comprising laterally spaced portions on the underside of a load and said hinges having portions extending above said upper arms and said lower fork arms for providing stops for a container on said arms and retaining said container on said upper arms of said carrier during the upward swinging of the latter to said inclined dumping position, said hinges including lug portions on the forward ends of said lower arms, and said lug portions having sloping forward sides providing forwardly and downwardly sloping bevels on said lower arms to facilitate entry of the forward ends of said arms into said recesses of said pallet.

5. An attachment for a fork lift truck having a load handling elevator and connecting means for detachably supporting the handling device on said elevator, said attachment comprising a framework including an upright portion having means for cooperating with said connecting means for detachably connecting the framework to the lift truck elevator and a generally horizontal load supporting portion extending forwardly from said upright portion at its lower end thereof comprising a pair of laterally spaced fork members with a clearance space therebetween to adapt the members for insertion beneath a palletized load, a load carrier superposed on said horizontal portion comprising a pair of laterally spaced arms superposed on said fork members and having a clearance space therebetween to provide for insertion of said arms with said fork members beneath a palletized load, hinge means pivotally connecting said arms to said fork members at their outer forward end thereof for swinging movement about the forward end of said load carrier to an inclined dumping position, a generally vertical mast assembly on said framework adjacent said upright portion and including an elevator, and means operatively connecting said elevator to said load carrier to swing the rear of said load carrier upwardly to move said load carrier to its said inclined dumping position, said hinge means comprising lug portions on the forward ends of said fork members with said lug portions having sloping forward sides providing forwardly and downwardly sloping bevels on said fork members to facilitate movement of the forward ends of said arms underneath a pallet having separate recesses for receiving said fork members and said hinge means projecting upwardly sufficiently from said arms to form a stop for a container on said carrier during dumping.

6. In a lifting or dumping apparatus, a framework having a generally horizontal forwardly extending first portion, a load carrier adapted to receive a load and superposed on said portion and comprising a generally horizontal forwardly extending second portion, hinge means connecting said forwardly extending portions adjacent the front ends thereof and providing for upward swinging movement of said carrier to an inclined dumping position where the rear thereof is elevated, vertically extending mast means on said framework adjacent the rear of said carrier and in engagement with the rear of said carrier including an elevator movable therealong, means pivotally connecting the lower end of said mast means to said framework adjacent the rear of said carrier, means connecting said elevator with said carrier for causing the swinging movement of the latter about said hinge means, said mast means pivoting forwardly as said carrier swings upwardly and said engagement of said carrier with said mast means limiting the forward movement of the latter as said carrier is swung upwardly, said mast means being generally circular in cross section and the rear of said carrier having a complementary shaped part which engages said mast means which is of curved cross section in a plane transverse to said mast to fit thereabout and which is convexly curved in a generally vertical plane to provide for rocking relative to said mast means during the upward movement of said carrier.

7. A fork lift type apparatus for handling a palletized load comprising a base having a first upright rear wall means and a first forwardly extending portion projecting therefrom comprising a pair of spaced fork members adapted to be inserted beneath a palletized load, a carrier on said fork members adapted to receive a load thereon comprising containers in stacked relation, said carrier comprising a second upright rear wall means and laterally spaced forwardly extending arms superposed on said fork members and insertable with the latter beneath a palletized load, hinge means connecting said first and forwardly extending arms and said fork members adjacent the forward ends thereof and providing for upward swinging of said carrier to an inclined dumping position, said hinge means comprising upright lug portions fixed on said fork members, said lug portions having forwardly and downwardly inclined forward sides adapted to lead the fork members beneath a load, mast means connected with said base and extending thereabove adjacent said upright rear wall means; elevator means movable along said mast means and connected with said carrier for causing the swinging movement of the latter; said second forwardly extending portion being engageable with said load on the underside thereof and said second upright rear wall means being engageable with the rear portion of a lower one of said containers, and load engageable wall means on said first upright rear wall means and projecting forwardly therefrom so as to occupy a position substantially in vertical alignment with and spaced above said second upright rear wall means, when said carrier is in its lowered position, for engagement with the rear portion of an upper one of said containers.

8. In lifting and dumping apparatus, a base having a first upright rear wall means and a first forwardly extending portion projecting therefrom; a carrier adapted to receive a load thereon comprising containers in a stacked relation; said carrier comprising a second upright rear wall means and a second forwardly extending portion connected therewith; hinge means connecting said first and second forwardly extending portions adjacent the front ends thereof and providing for upward swinging of said carrier to an inclined dumping position; mast means connected with said base and extending thereabove; elevator means movable along said mast means and connected with said carrier for causing the swinging movement of the latter; said second forwardly extending portion being engageable with the rear portion of a lower one of said containers; and load engageable means on said first upright rear wall means and projecting forwardly and upwardly therefrom so as to occupy a position substantially in vertical alignment with and spaced above said second upright rear wall means, when said carrier is in its lowered position, for engagement with the rear portion of an upper one of said containers, said mast means being pivotally connected with said base for swinging relative thereto; said first rear wall means comprising wall portions spaced apart laterally for movement of said mast therebetween and comprising bracket members mounted on said wall portions with said bracket members being spaced apart laterally for passage of said mast means therebetween during the swinging of the mast means.

9. A load handling attachment for a fork lift truck, as defined in claim 5, wherein said fork members comprise angularly disposed portions defining a pair of laterally spaced corner recesses on said base, anchor blocks located at said corner recesses and means pivotally connecting the lower end of said mast to said anchor blocks.

10. A load handling attachment for a fork lift truck, as defined in claim 5, wherein said mast means pivots forwardly and engages the rear of said carrier as the latter swings upwardly, said mast means being generally circular in cross-section and the rear of said carrier having a complementary shaped part which engages said mast means which is of a curved cross section in a plane transverse to said mast to fit thereabout and which is convexly curved in a generally vertical plane to provide for rocking movement of the carrier relative to said mast means during the upward movement of said carrier.

References Cited by the Examiner

UNITED STATES PATENTS

| | | | |
|---|---|---|---|
| 907,218 | 12/09 | Bieber et al. | 105—271 |
| 1,607,734 | 11/26 | Fortini. | |
| 1,628,389 | 5/27 | Cochran | 214—313 |
| 1,676,127 | 7/28 | Bernier. | |
| 1,679,075 | 7/28 | Coder et al. | |
| 1,766,157 | 6/39 | Weber et al. | |
| 1,786,889 | 12/30 | Allan. | |
| 1,826,490 | 10/31 | Abbe. | |
| 2,288,496 | 6/42 | Swedberg | 214—144 X |
| 2,482,692 | 9/49 | Quales et al. | 214—620 |
| 2,497,385 | 2/50 | Young et al. | 214—510 |
| 2,701,658 | 2/55 | Radin et al. | 214—620 |
| 2,941,684 | 6/60 | Quayle | 214—652 |
| 2,975,762 | 3/61 | Blatt et al. | |

FOREIGN PATENTS

| | | |
|---|---|---|
| 1,090,855 | 10/54 | France. |
| 931,579 | 8/55 | Germany. |
| 164,961 | 6/21 | Great Britain. |

HUGO O. SCHULZ, Primary Examiner.

MORRIS TEMIN, Examiner.